United States Patent
Karlsson et al.

(10) Patent No.: US 6,222,829 B1
(45) Date of Patent: *Apr. 24, 2001

(54) INTERNET PROTOCOL TELEPHONY FOR A MOBILE STATION ON A PACKET DATA CHANNEL

(75) Inventors: Torgny Karlsson, Bromma; Dick Andersson, Kista, both of (SE)

(73) Assignee: Telefonaktieblaget L M Ericsson (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 6 days.

(21) Appl. No.: 08/996,936

(22) Filed: Dec. 23, 1997

(51) Int. Cl.[7] ............................. H04L 12/66; H04L 7/00
(52) U.S. Cl. ................ 370/329; 370/354; 379/88.17; 455/426; 455/553
(58) Field of Search ............................ 370/352, 354–356, 370/400, 401, 338, 389, 328, 316, 329; 379/88.17, 310, 93.01; 455/553, 557; 704/270

(56) References Cited

U.S. PATENT DOCUMENTS

| | | | |
|---|---|---|---|
| H1641 | 4/1997 | Sharman | 370/338 |
| 5,544,222 | * 8/1996 | Robinson et al. | 455/557 |
| 5,604,737 | 2/1997 | Iwami et al. | 370/352 |
| 5,623,605 | 4/1997 | Keshav et al. | 709/236 |
| 5,659,596 | * 8/1997 | Dunn | 455/456 |
| 5,673,259 | 9/1997 | Quick, Jr. et al. | 370/342 |
| 5,793,762 | * 8/1998 | Penners et al. | 370/389 |
| 5,889,774 | * 3/1999 | Mirashrafi et al. | 370/352 |
| 5,896,369 | * 4/1999 | Warsta et al. | 370/338 |
| 5,901,352 | * 5/1999 | St-Pierre et al. | 455/426 |
| 5,910,946 | * 6/1999 | Csapo | 370/328 |
| 5,943,399 | * 8/1999 | Bannister et al. | 379/88.17 |
| 5,956,331 | * 9/1999 | Rautiola et al. | 370/338 |
| 5,960,074 | * 9/1999 | Clark | 379/310 |
| 5,991,639 | * 11/1999 | Rautiola et al. | 455/553 |
| 6,006,189 | * 12/1999 | Strawczynski et al. | 704/270 |
| 6,137,783 | * 10/2000 | Sallberg | 370/316 |

FOREIGN PATENT DOCUMENTS

| | | |
|---|---|---|
| 0766 490 A2 | 4/1997 | (EP) . |
| 0 799 759 A2 | 6/1997 | (EP) . |
| WO 95/31060 | 11/1995 | (WO) . |
| WO 97/16007 | 5/1997 | (WO) . |
| WO 97/29581 | 8/1997 | (WO) . |

OTHER PUBLICATIONS

PCT International Search Report, Apr. 8, 1999, PCT/SE 98/02395.

(List continued on next page.)

Primary Examiner—Hassan Kizou
Assistant Examiner—John Pezzlo
(74) Attorney, Agent, or Firm—Jenkens & Gilchrist, A Professional Corporation

(57) ABSTRACT

A method and apparatus are provided for effectuating voice communication between a mobile station and a mobile radio network. A gateway to the mobile radio network receives an incoming voice call for a destination mobile station and accesses information pertaining the status and location of the destination mobile station. A determination is made as to whether the destination mobile station is capable of operation in a voice mode using circuit-switched communications across a traffic channel. If the destination mobile station is operable in the voice mode, a circuit-switched communication on a traffic channel is established between the mobile radio network and the destination mobile station. Otherwise, the incoming voice call is routed to a voice gateway which converts the voice call to data packets and routes the data packets to the mobile station across an Internet Protocol communication network to a packet gateway of the mobile radio network. The packet gateway routes the call across a packet data channel of the mobile radio network to the destination mobile station using a packet data service.

17 Claims, 3 Drawing Sheets

OTHER PUBLICATIONS

Hansson, A., et al.: "Phone Doubler—A Step Towards Integrated Internet and Telephone Communities", Ericsson Review, No. 4, 1997, pp. 142–151.

Thom, G. A., "H. 323 The Multimedia Communications Standard for Local Area Networks", IEEE Communications Magazine, vol. 34, No. 12, Dec. 1996, pp. 52–56.

European Patent Office, Standard Search Report, Mar. 3, 1998, File No. RS 100275.

* cited by examiner ly carried across the mobile radio network using circuit-switched communications on a traffic channel, data packets associated with the packet data service are carried across the mobile radio network using packet-switched communications on a packet channel. For example, data packets can be carried on the packet channel using a Transmission Control Protocol/Internet Protocol (TCP/IP).

INTERNET PROTOCOL TELEPHONY FOR A MOBILE STATION ON A PACKET DATA CHANNEL

BACKGROUND OF THE INVENTION

1. Technical Field of the Invention

The present invention pertains in general to routing of voice and data traffic in a mobile radio network and, more particularly, to a method and apparatus for routing voice telephone calls received by a mobile radio network to a destination mobile station via an Internet Protocol communication network on a data packet channel.

2. Description of the Related Art

In addition to voice communication, mobile radio networks are increasingly supporting packet data services. Frequently, packet data services are used to connect digital terminal equipment, such as a personal computer communicating through a mobile station operating in the mobile radio network, to an Internet Protocol (IP) communication network such as, for example, an Internet or an Intranet. While voice communication is typically carried across the mobile radio network using circuit-switched communications on a traffic channel, data packets associated with the packet data service are carried across the mobile radio network using packet-switched communications on a packet channel. For example, data packets can be carried on the packet channel using a Transmission Control Protocol/Internet Protocol (TCP/IP).

In certain situations, a mobile station is unable to support a voice connection using circuit-switched communications on the traffic channel. For example, the mobile station may be equipped to operate only in a packet mode using packet-switched communications on the packet channel, with no capability to communicate in a voice mode using circuit-switched communications on the traffic channel. In another example, the mobile station may be operating in the packet mode with the digital terminal equipment connected to the Internet/Intranet on the packet channel at the time when a voice connection to the mobile station is being attempted. In this situation, unless the mobile station is equipped to operate simultaneously in both the packet mode and voice mode, the mobile station needs to release the connection on the packet channel and register on the traffic channel in order to communicate in the voice mode. In yet another example, all traffic channels available for voice communication with the mobile station may be in use and are, therefore, unavailable. In these and other similar situations, the mobile radio network is unable to provide voice communication with the mobile station.

It would be advantageous, therefore, to devise a method and apparatus for providing voice communication between a mobile station operating in a packet mode and a mobile radio network on a communication path other than a voice traffic channel. It would also be advantageous if such a method and apparatus routed the voice communication on a communication network other than the mobile radio network.

SUMMARY OF THE INVENTION

The present invention comprises a method and apparatus for effectuating voice communication between a mobile station and a mobile radio network. A gateway server to the mobile radio network receives an incoming voice call for a destination mobile station and accesses information pertaining the status and location of the destination mobile station. A determination is made as to whether the destination mobile station is capable of operation in a voice mode using circuit-switched communications across a traffic channel. If the destination mobile station is capable of operation in voice mode, a circuit-switched communication on a traffic channel is established between the mobile radio network and the destination mobile station. Otherwise, if the destination mobile station is not capable of operation in the voice mode and capable of supporting a packet switched communication on a packet channel, the incoming voice call is routed to a voice gateway server which converts the voice call to data packets, and routes the data packets to the mobile station across an IP communication network to a packet gateway server of the mobile radio network. The packet gateway server routes the call via a packet data channel of the mobile radio network to the destination mobile station using a packet data service.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
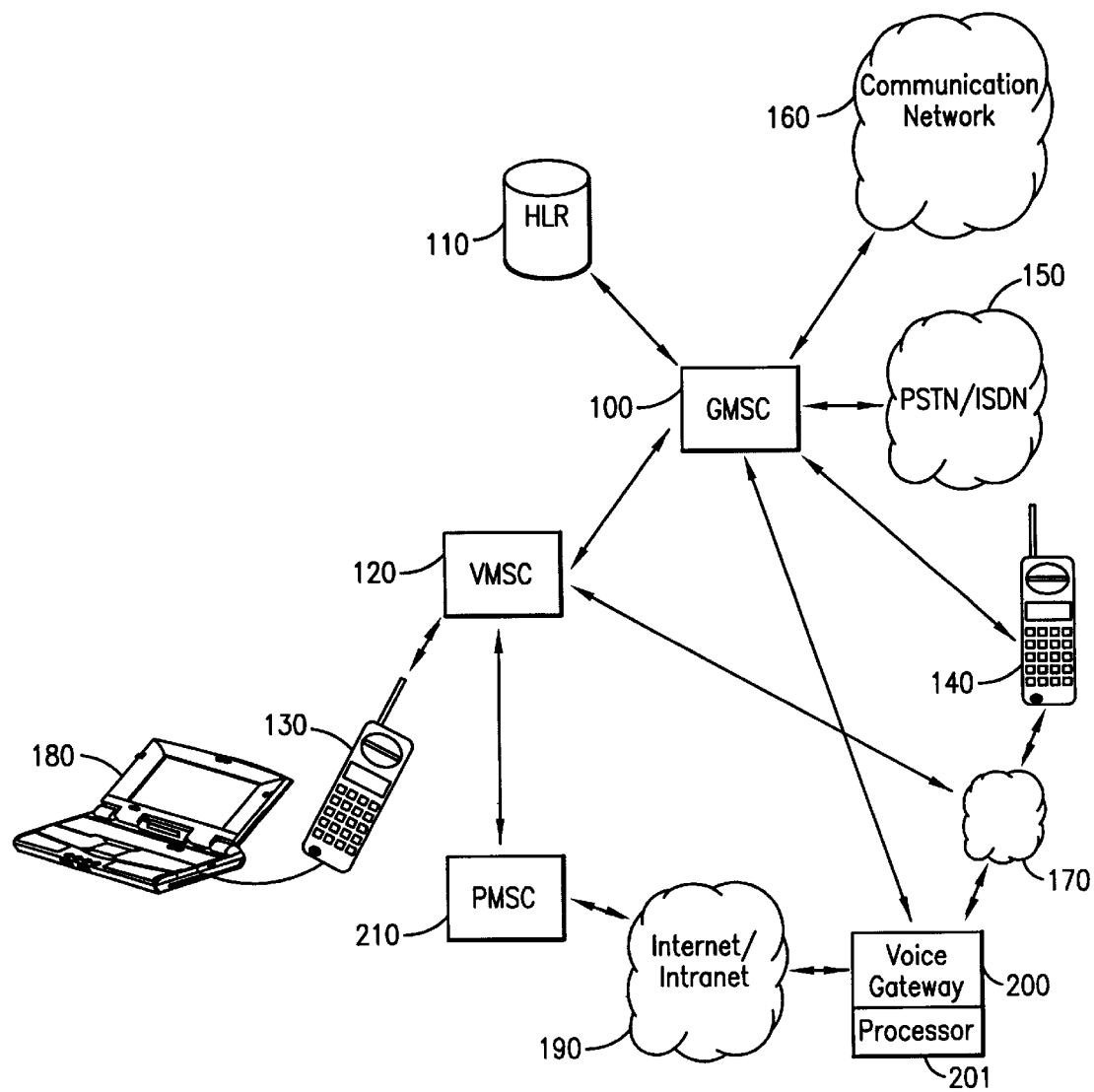
FIG. 1 is a functional block diagram of an apparatus for effectuating voice communication between a mobile station and a mobile radio network consistent with a preferred embodiment of the present invention.

Referring now to FIG. 1, there is illustrated a functional block diagram of an apparatus for effectuating voice communication between a mobile station and a mobile radio network consistent with a preferred embodiment of the present invention. A cellular telephone network comprises a Gateway Mobile services Switching Center (GMSC) 100, a Home Location Register (HLR) 110, and a Visited Mobile services Switching Center (VMSC) 120. The mobile radio network communicates with a plurality of mobile stations, including a first mobile station 130 and a second mobile station 140, over an air interface in a manner conforming to any conventional mobile radio network protocol including, but not limited to, the Personal Digital Cellular system (PDC), the Global System for Mobile communications (GSM), Advanced Mobile Phone Service (AMPS) and Digital Advanced Mobile Phone Service (DAMPS), among others. Although any protocol may be used in accordance with the present invention, the PDC protocol is used by way of example in this disclosure.

The mobile radio network communicates with a Public Switched Telecommunication Network/Integrated Services Digital Network (PSTN/ISDN) 150 and other communication networks 160 via the GMSC 100. Although FIG. 1 depicts the second mobile station 140 as communicating with the mobile radio network via the GMSC 100, the second mobile station 140, alternatively, can connect to the mobile radio network via other portions of the mobile radio network 170 and is routed within the mobile radio network in a manner consistent with the particular mobile radio network protocol currently in use.

To effectuate voice communication with a destination mobile station, which in this example is the first mobile station 130, incoming voice calls from the PSTN/ISDN 150 or other communication networks 160 are routed to the GMSC 100. The GMSC 100 requests routing information from the HLR 110 for routing the incoming voice call to the destination mobile station 130. The HLR 110 stores information pertaining to the destination mobile station 130 such as its operating mode, the identity of the VMSC 120 currently servicing the destination mobile station 130 and routing information to the destination mobile station 130. Using the routing information provided by the HLR 110, the GMSC 100 routes the incoming voice call to the VMSC 120 which communicates with the destination mobile station 130 using circuit-switched communications on the traffic channel.

To effectuate voice communication between the second mobile station 140 and the destination mobile station 130, incoming voice calls from the second mobile station 140 are routed to the GMSC 100 and handled in a manner consistent with that for incoming voice calls from the PSTN/ISDN 150. Alternatively, incoming voice calls from the second mobile station 140 are routed to the VMSC 120, and ultimately to the destination mobile station 130, via other portions of the mobile radio network 170 in a manner consistent with the particular mobile radio network protocol currently in use.

To effectuate communication between digital terminal equipment 180 such as, for example, a personal computer and an Internet/Intranet 190 or other Internet Protocol (IP) communication network using a packet data service, the digital terminal equipment 180 communicates with the mobile radio network via the mobile station 130. Packet data is communicated over the mobile radio network using packet-switched communications, such as TCP/IP, on a packet channel. Packet data is routed between the destination mobile station 130 and a Packet Mobile services Switching Center (PMSC) 210 via the VMSC 120 using a packet data service commonly known in the industry. The PMSC 210 interfaces the mobile radio network to the Internet/Intranet 190 or other IP communication network in a manner also commonly known in the industry.

To effectuate an alternative communication link between the mobile radio network and the destination mobile station 130, a Voice Gateway 200, for example, a voice gateway server provides an interface between the GMSC 100 and the Internet/Intranet 190 or other IP communication network. Although the Voice Gateway 200 is depicted in FIG. 1, as being remote to both the GMSC 100 and the VMSC 120, the Voice Gateway 200 may, alternatively, be co-located with some other node in the network. Incoming voice telephone calls addressed to the destination mobile station 130 are received by the GMSC 100. The GMSC 100 requests routing information from the HLR 110 for routing the incoming voice telephone call to the destination mobile station 130, and determines whether the destination mobile station 130 is capable of operation in voice mode based on the information provided by the HLR 110. If the destination mobile station 130 is capable of operation in voice mode, the HLR 110 provides the GMSC 100 with a response containing a pursuit routing number to the VMSC 120 and the incoming call is routed to the destination mobile station 130 as a circuit-switched communications on the traffic channel. If, on the other hand, the destination mobile station is incapable of operation in voice mode and the destination mobile station 130 is capable of supporting a packet-switched communication on a packet channel, the response from the HLR 110 contains a pursuit routing number to the Voice Gateway 200. The pursuit routing number to the Voice Gateway 200 indicates that the destination mobile station 130 is incapable of operating in voice mode and the GMSC 100 routes the incoming voice call, along with the response from the HLR 110, to the Voice Gateway 200.

The identity of the destination mobile station 130 is mapped, either by look-up table or by calculation, by the HLR 110, the GMSC 100 or, alternatively, by a processor 201 associated with the Voice Gateway 200, to the current IP address assigned to the destination mobile station 130 used in the packet data connection. The Voice Gateway 200 routes the incoming voice call to the destination mobile station 130 based on its current IP address. The incoming voice call is, thus, routed between the Voice Gateway 200 and the PMSC 210 across the Internet/Intranet 190, and between the PMSC 200 and the destination mobile station 130 via the VMSC 120. The IP connection across the Internet/Intranet 190 is set up using, for example, ITU-T H.323 protocol. The connection between the PMSC 210 and the destination mobile station 130 uses the packet data service provided by the mobile radio network.

The processor 201 in the Voice Gateway 200 also converts the incoming voice signal, typically a 64 kbps Pulse Code Modulation signal, received from the GMSC 100 to an IP telephony signal using, for example, ITU-T G.723.1 coding specification over a User Datagram Protocol/Internet Protocol at 5,300 bps or, alternatively, at 6,300 bps. As another example, if the incoming voice call originates from the second mobile station 140, the incoming voice signal can be coded according to the coding protocol used in the mobile network. This could, for example, be the Vector-Sum Excited Linear Predictive (VSELP) coding protocol used in PDC today. The Voice Gateway 200 converts this signal (VSLEP) to ITU-T G.723.1. Similarly, the processor 201 in the Voice Gateway 200 converts the IP telephony signal received across the Internet/Intranet 190 from the destination mobile station 130 to a voice signal compatible with the incoming voice signal. The incoming voice call, which is converted to the IP telephony signal, is received by the PMSC 210 from the Internet/Intranet 190 and is routed to the destination mobile station 130 using the packet data service provided by the mobile radio network.

Figure 2:
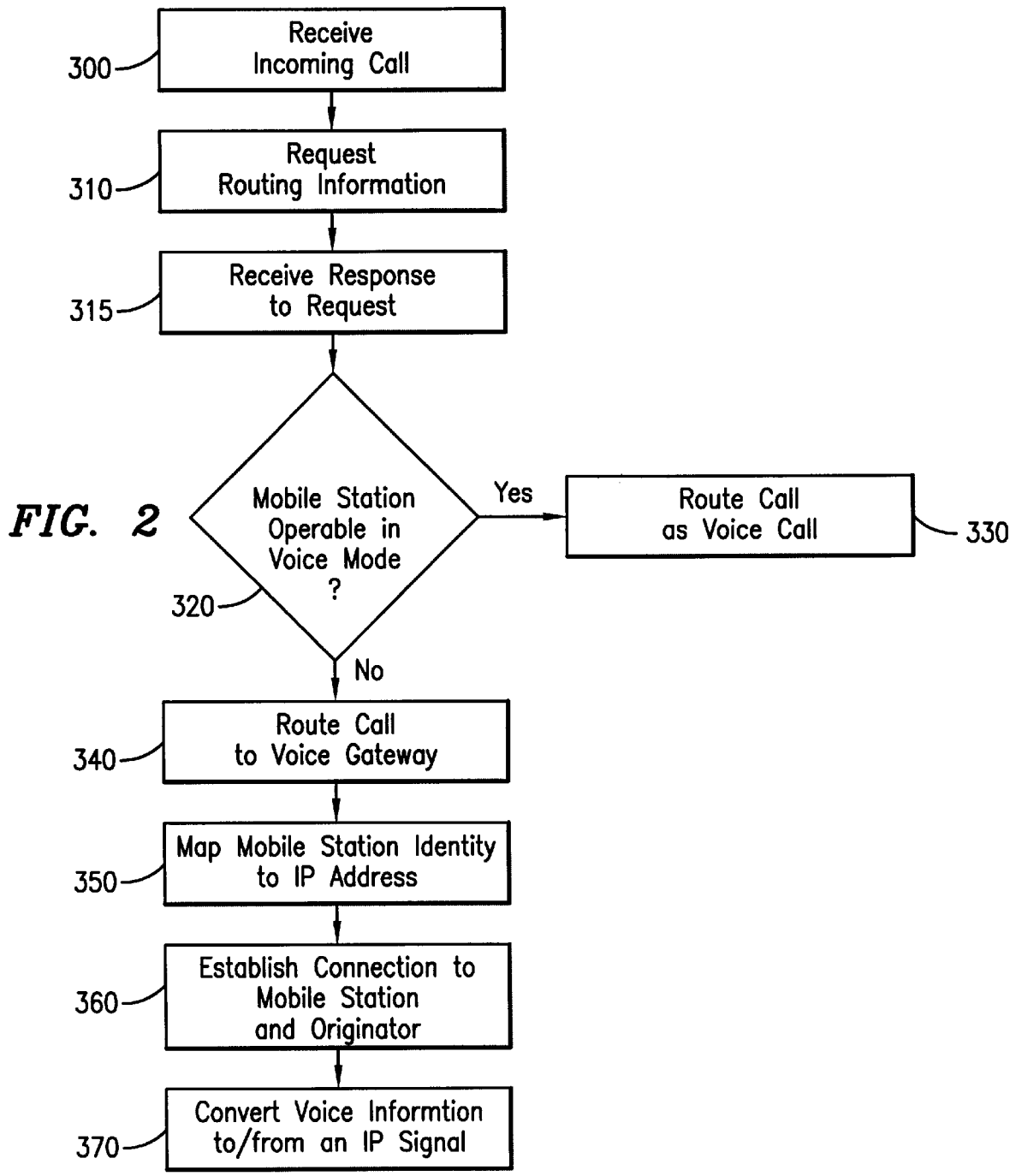
FIG. 2 is a flow diagram of a method for receiving voice communication by a mobile station from a mobile radio network consistent with the embodiment described in FIG. 1.
Figure 3:
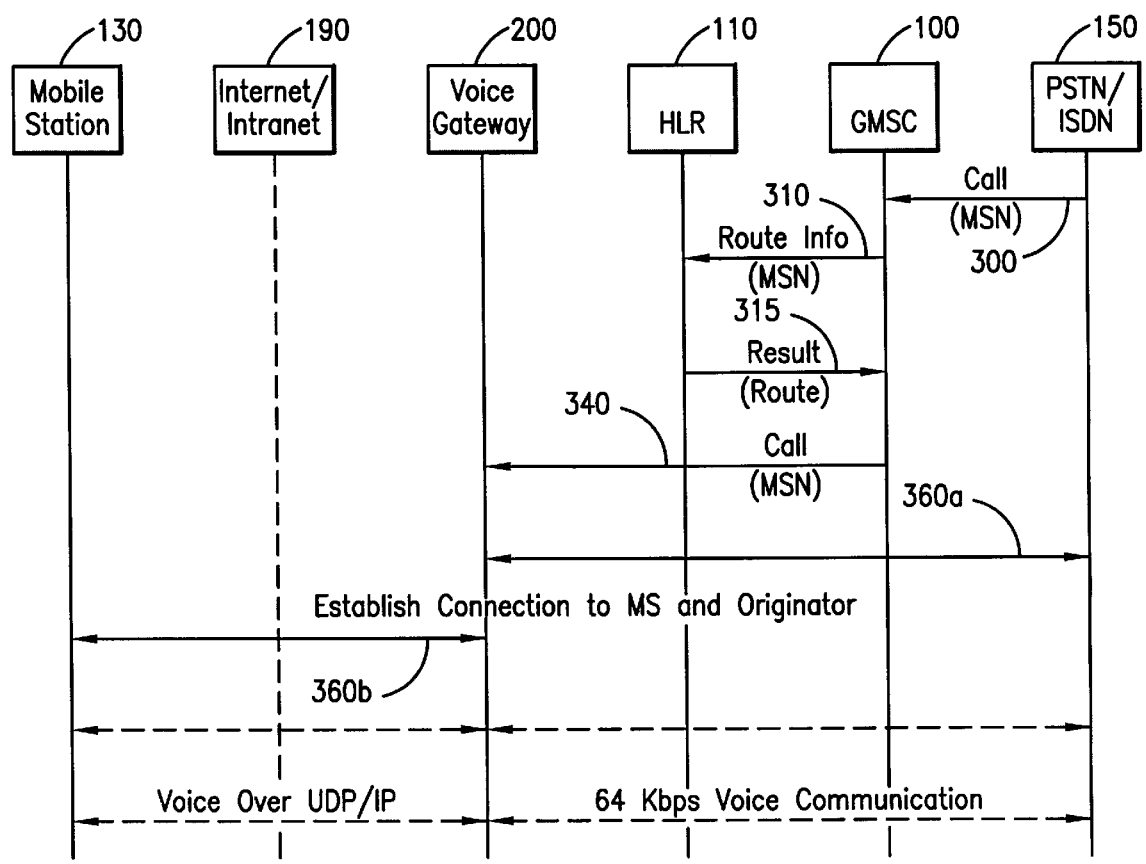
FIG. 3 is a signaling sequence diagram for receiving voice communication by a mobile station from a mobile radio network.

Referring additionally now to FIGS. 2 and 3, there is illustrated a flow diagram of a method for receiving voice communication by a mobile station from a mobile radio network consistent with the embodiment described in FIG. 1, and a signaling sequence diagram for receiving voice communication by a mobile station from a mobile radio network respectively. An incoming voice telephone call addressed to the destination mobile station 130, for example using a Mobile Subscriber Number (MSN) received by the GMSC 100 (step 300). The GMSC 100 requests routing information from the HLR 110 for routing the incoming voice telephone call to the destination mobile station 130 (step 310).

The GMSC 100 receives a response from the HLR 110 (step 315) and a determination is made by the GMSC 100 as to whether the destination mobile station 130 is capable of establishing a circuit-switched communication on a traffic channel (step 320). If the destination mobile station 130 is capable of establishing a connection in voice mode, the HLR 100 provides the GMSC 100 with a response containing a pursuit routing number to the VMSC 120 and the incoming call is routed to the destination mobile station 130 as a circuit-switched communication on the traffic channel (step 330). If, on the other hand, the destination mobile station is incapable of establishing a connection in voice mode and the destination mobile station 130 is capable of supporting a packet-switched communications on a packet channel, the response from the HLR 110 contains a pursuit routing number to the Voice Gateway 200. The pursuit routing number to the Voice Gateway 200 indicates that the destination mobile station 130 is incapable of operating in the voice mode and the GMSC 100 routes the incoming voice call, along with the response from the HLR 110, to the Voice Gateway 200 (step 340).

The identity of the destination mobile station 130 is mapped, either by look-up table or calculation, to the current IP address assigned to the destination mobile station 130 used in the packet data connection (step 350). The mapping function is performed by the HLR 110, the GMSC 100 or, alternatively, by the processor 201 in the Voice Gateway 200. The Voice Gateway 200 routes the incoming voice call to the destination mobile station 130 (step 360) based on its current IP address. The incoming voice call is, thus, routed between the Voice Gateway 200 and the PMSC 210 across the Internet/Intranet 190 (step 360*a*), and between the PMSC 200 and the destination mobile station 130 via the VMSC 120 (step 360*b*). The IP connection across the Intranet/Intranet 190 is set up using, for example, the ITU-T H.323 protocol.

The processor 201 associated with the Voice Gateway 200 also converts the incoming voice signal, typically a 64 kbps Pulse Code Modulation (PCM) signal, received from the GMSC 100 to an IP telephony signal using, for example, ITU-T G.723.1 specified speech coding over a User Datagram Protocol/Internet Protocol at 5,300 bps or, alternatively, at 6,300 bps (step 370). This could, for example, be the Vector-Sum Excited Linear Predictive (VSELP) coding protocol used in PDC today. The Voice Gateway 200 converts this signal (VSLEP) to ITU-T G.723.1. Similarly, the Voice Gateway 200 converts the IP telephony signal received across the Internet/Intranet 190 from the destination mobile station 130 to a voice signal compatible with the incoming voice signal. The incoming voice call, which is converted to the IP telephony signal, is received by the PMSC 210 from the Internet/Intranet 190 and is routed to the destination mobile station 130 using the packet data service provided by the mobile radio network.

Although the preferred embodiment of the apparatus and method of the present invention has been illustrated in the accompanying Drawings and described in the foregoing Detailed Description, it is understood that the invention is not limited to the embodiment disclosed, but is capable of numerous rearrangements, modifications and substitutions without departing from the spirit of the invention as set forth and defined by the following claims.

What is claimed is:

1. An apparatus for effectuating voice communication with a mobile station, comprising:
   a gateway mobile services switching center capable of receiving an incoming voice call and also capable of determining if said mobile station is able to operate in a voice mode based on an information provided by a HLR and further capable of routing said voice call across a mobile radio network toward said mobile station by enabling circuit-switched communications with said mobile station on a traffic channel if said mobile station is able to operate in said voice mode; and
   a voice gateway, coupled to said gateway mobile services switching center, capable of routing said voice call across an Internet Protocol communication network and the mobile radio network toward said mobile station by enabling packet-switched communications with said mobile station on a packet channel if said information provided by said HLR indicates that said mobile station is not able to operate in said voice mode.

2. The apparatus recited in claim 1, wherein said voice gateway sets up a call to said mobile station via said Internet Protocol communication network and a packet mobile services switching center.

3. The apparatus recited in claim 2, wherein said voice gateway sets up said call to said mobile station using ITU-T H.323 protocol.

4. The apparatus recited in claim 1, further comprising:
   means for converting said incoming voice call from a voice format to an Internet Protocol telephony format; and
   means for converting packet data received across said Internet Protocol communication network from said mobile station from said Internet Protocol telephony format to said voice format.

5. The apparatus recited in claim 4, wherein said means for converting said incoming voice call from a voice format to an Internet Protocol telephony format comprises said processor for converting said incoming voice call from an incoming 64 kbps PCM signal to an outgoing 5,300 bps ITU-T G.723.1 protocol signal and further, wherein said means for converting packet data received across said Internet Protocol communication network from said mobile station from said Internet Protocol telephony format to said voice format comprises said processor for converting packet data received across said Internet Protocol communication network from an incoming 5,300 bps ITU-T G.723.1 protocol signal to an outgoing 64 kbps PCM signal.

6. The apparatus recited in claim 4, wherein said means for converting said incoming voice call from a voice format to an Internet Protocol telephony format comprises said processor for converting said incoming voice call from an incoming 64 kbps PCM signal to an outgoing 6,300 bps ITU-T G.723.1 protocol signal and further, wherein said means for converting packet data received across said Internet Protocol communication network from said mobile station from said Internet Protocol telephony format to said voice format comprises said processor for converting packet data received across said Internet Protocol communication network from an incoming 6,300 bps ITU-T G.723.1 protocol signal to an outgoing 64 kbps PCM signal.

7. The apparatus recited in claim 1, wherein said Internet Protocol communication network is an Internet.

8. The apparatus recited in claim 1, wherein said Internet Protocol communication network is an Intranet.

9. A method for effectuating voice communication between a mobile station and a mobile radio network comprising the steps of:
   receiving an incoming voice call via a GMSC;
   determining if said mobile station is capable of operation in a voice mode or a packet switched communication mode based on an information provided by a HLR associated with said GMSC;
   routing said voice call across said mobile radio network toward said mobile station by enabling circuit-switched communications with said mobile station on a traffic channel if said information provided by said HLR indicated that said mobile station is capable of operation in said voice mode; and
   routing said incoming voice call to said mobile station across an Internet Protocol communication network and the mobile radio network by enabling packet-switched communications with said mobile station on a packet data channel of said information provided by said HLR indicated that said mobile radio network if said mobile station is operating in a packet switched communication mode.

10. The method recited in claim 9, wherein the step of determining if said mobile station is capable of operation in said voice mode comprises the steps of:

requesting routing information from said HLR for routing said incoming voice call to said mobile station;

identifying said mobile station as operable in said voice mode if a response to said request contains a first pursuit routing number to a visited mobile services switching center; and identifying said mobile station as inoperable in said voice mode if said response contains a second pursuit routing number to a Voice Gateway.

11. The method recited in claim 10, wherein said step of routing said incoming voice call to said mobile station further comprises the steps of:

routing said incoming voice call to said voice gateway;

mapping said mobile station to an Internet Protocol address;

setting up a call between said voice gateway and said mobile station located at said Internet Protocol address; and communicating between said voice gateway and said mobile station.

12. The method recited in claim 11, wherein the step of communicating between said voice gateway and said mobile station comprises the steps of:

converting said incoming voice call from a voice format to an Internet Protocol telephony format; and converting packet data received across said Internet Protocol communication network sent by said mobile station from said Internet Protocol telephony format to said voice format.

13. The method recited in claim 11, wherein the step of communicating between said voice gateway and said mobile station comprises the steps of:

communicating between said voice gateway and a packet data gateway across an Internet; and communicating between said packet data gateway and said mobile station via a packet data service of said mobile radio network.

14. A system for effectuating voice communication between a mobile station and a mobile radio network, said system comprising:

means for receiving an incoming voice call;

means for determining if said mobile station is able to operate in a voice mode or a packet switched communication mode based on an information provided by a HLR;

first means for routing said voice call across said mobile radio network toward said mobile station by enabling circuit-switched communications with said mobile station on a traffic channel if said mobile station is capable of operation in said voice mode;

second means for routing said voice call across an Internet Protocol communication network and the mobile radio network toward said mobile station by enabling packet-switched communications with said mobile station on a packet channel if said mobile station is not able to operate in said voice mode.

15. The system recited in claim 14, wherein said means for determining if said mobile station is capable of operation in said voice mode further includes:

means for requesting routing information for routing said incoming voice call to said mobile station;

means for identifying said mobile station as operable in said voice mode if a response to said request contains a first pursuit routing number to a visited mobile services switching center; and means for identifying said mobile station as inoperable in said voice mode if said response contains a second pursuit routing number to a voice gateway.

16. The system recited in claim 14, wherein said second means for routing said incoming voice call to said mobile station further includes:

means for mapping said mobile station to an Internet Protocol address;

means for setting up a call with said mobile station located at said Internet Protocol address; and means for communicating between said voice gateway and said mobile station.

17. The system recited in claim 16, wherein said means for communicating between said voice gateway and said mobile station further includes:

means for converting said incoming voice call from a voice format to an Internet Protocol telephony format; and means for converting packet data received across said Internet Protocol communication network sent by said mobile station from said Internet Protocol telephony format to said voice format.

* * * * *